Feb. 27, 1934.   V. KINSER   1,949,078
VARIABLE SPEED TRANSMISSION
Filed Oct. 3, 1932   4 Sheets-Sheet 4

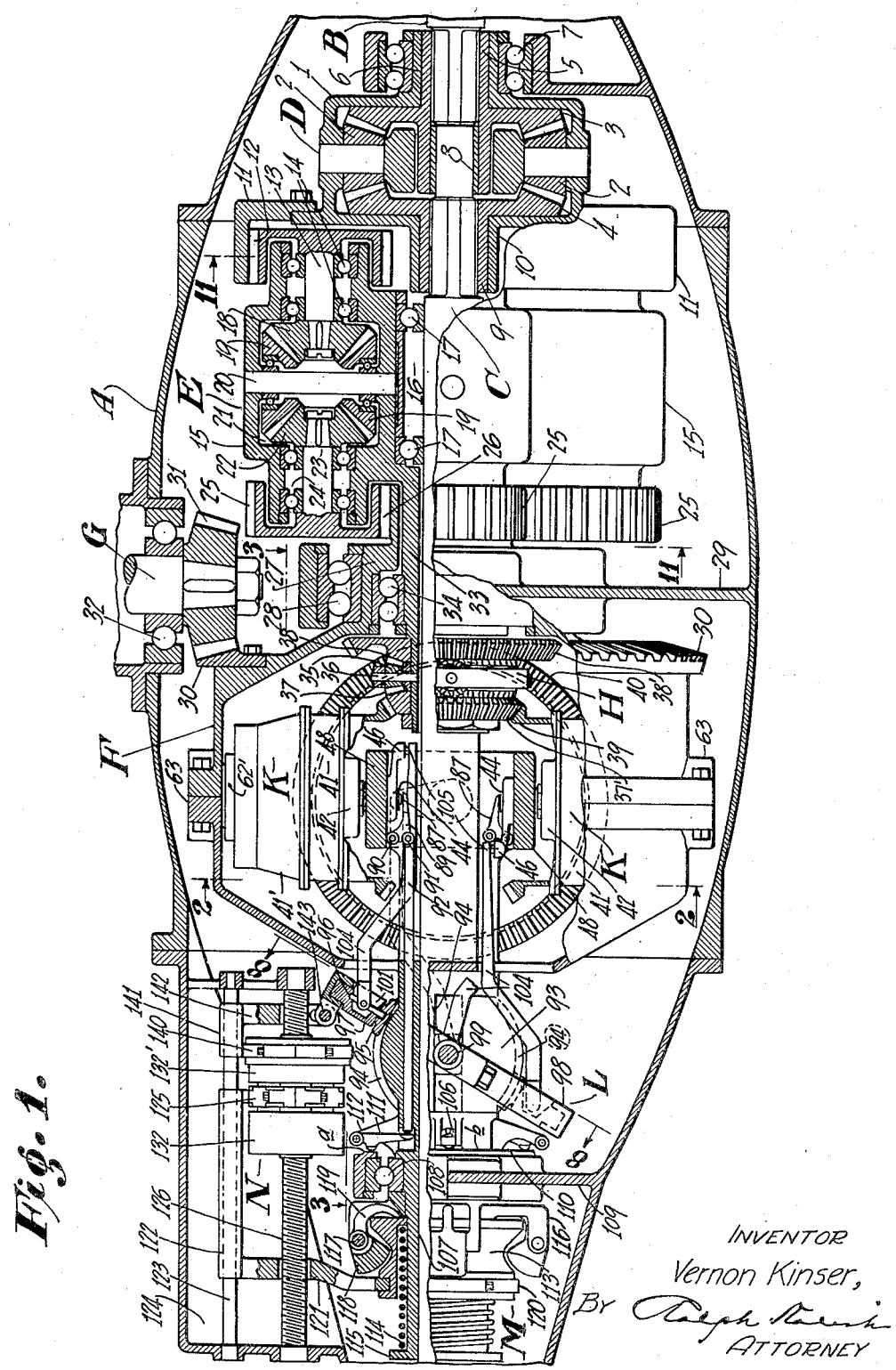

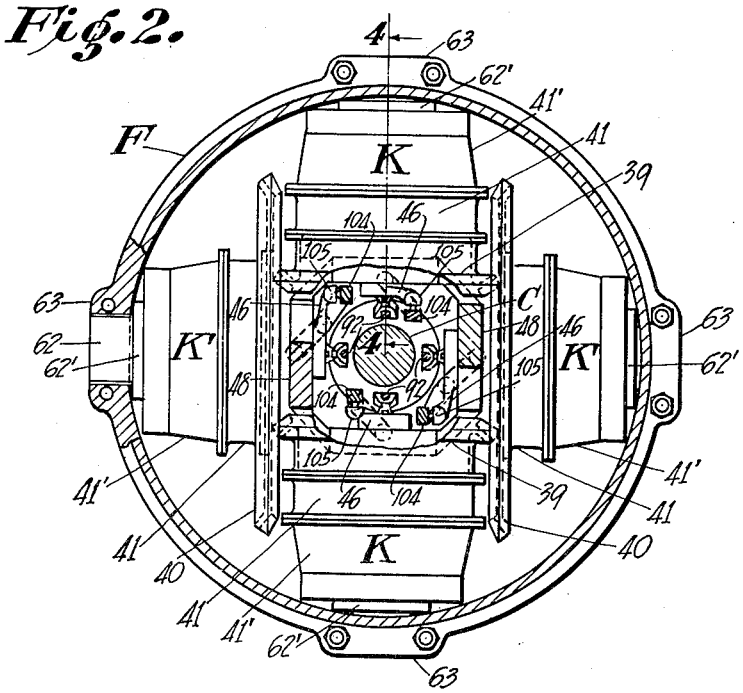
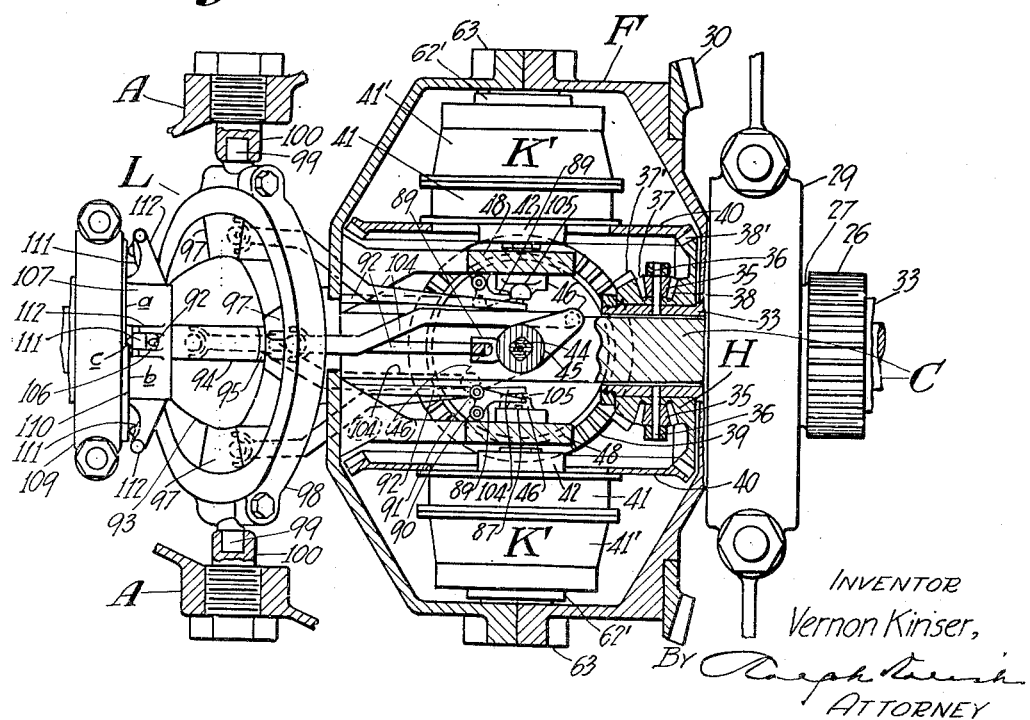

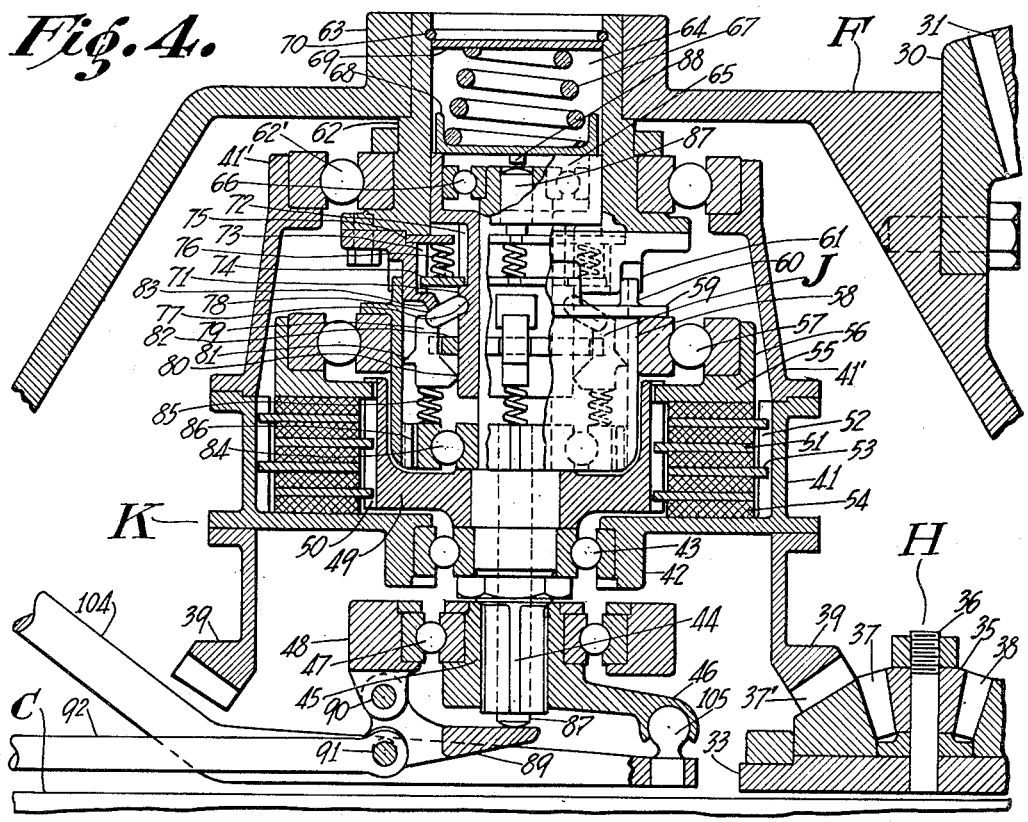

INVENTOR
Vernon Kinser,
By
ATTORNEY

Patented Feb. 27, 1934

1,949,078

UNITED STATES PATENT OFFICE

1,949,078

VARIABLE SPEED TRANSMISSION

Vernon Kinser, Purdy, Mo.

Application October 3, 1932. Serial No. 636,042

34 Claims. (Cl. 74—34)

This invention relates generally to speed transmissions and has more particular reference to speed transmissions of automatically variable type.

My invention has for its prime objects the provision of a transmission having substantially continuously variable speed transmission ratios between predetermined limits; the provision, in such apparatus, of means for automatically effecting variations in the speed transmission ratio responsively to variations in the speed of the driving element; the provision of a unique clutching mechanism having means for effecting automatic adjustment or "take-up" of the clutching-elements, and, in general, to improve the construction of transmissions adapted especially, though not exclusively, for automotive use.

And with the above and other objects in view, my invention resides in the novel features of form, construction, arrangement, and combination of parts hereinafter described and pointed out in the claims.

In the accompanying drawings,—

Figure 1 is a longitudinal sectional view through an automatic variable speed transmission of my invention;

Figure 2 is a transverse sectional view of the transmission taken approximately along the line 2—2, Figure 1, the housing walls being removed;

Figure 3 is a fragmentary longitudinally sectional view taken approximately along the line 3—3, Figure 1;

Figure 4 is an enlarged sectional view of one of the clutching mechanisms, taken approximately along the line 4—4, Figure 2;

Figure 5 is a transverse sectional view of the shifter mechanism, taken approximately along the line 5—5, Figure 6;

Figure 6 is a longitudinally sectional view of the shifter mechanism;

Figure 7 is a fragmentary transverse half sectional view of the shifter mechanism, taken approximately at the line 7, Figure 6;

Figure 8:
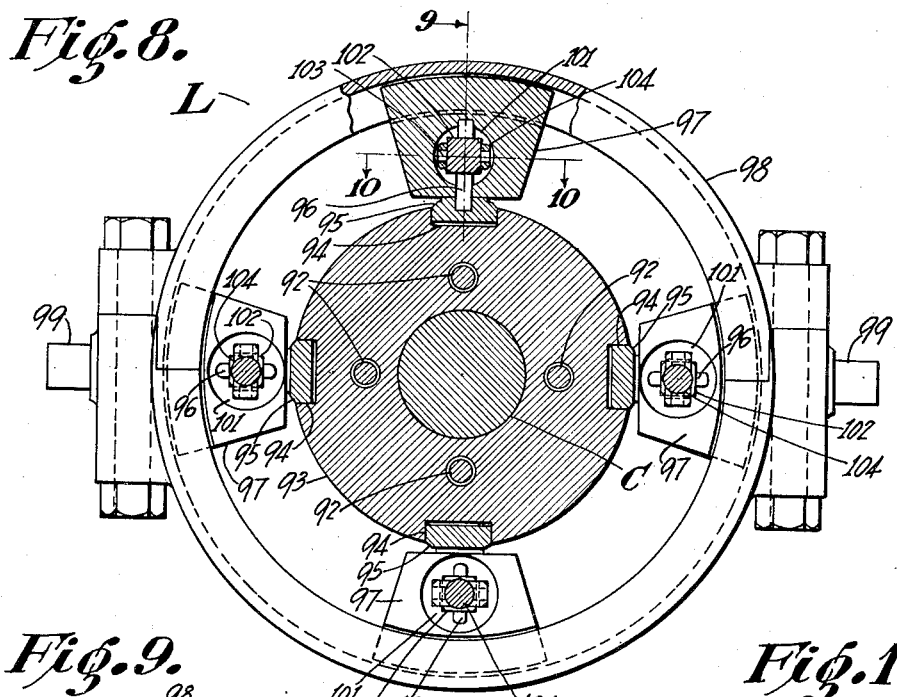
Figure 8 is a sectional view taken approximately along the line 8—8, Figure 1.

Referring now more in detail and by reference characters to the drawings, which illustrate a preferred embodiment of my invention, A designates a housing of the type similar to that conventionally employed in automotive rear axle construction, although it may here be said that my automatic transmission may be employed in connection with rear-wheel drive, front wheel drive, or jack-shaft drive vehicles.

In the usual manner, the housing A contains axle-shafts B, C, respectively, supported at their outer ends suitably by means not shown, the inner end of the shafts B, C, meeting at a conventional form of differential D disposed preferably at one side of the center of the housing A.

The differential D includes a cage 1 carrying the differential pinions 2 meshing with the differential gears 3, 4, the hub 5 of the gear 3 engaging the suitably squared end of the axle-shaft B and being rotarily mounted in the adjacent trunnion 6 of the cage 1, the trunnion 6 being, in turn, rotarily mounted in a bearing 7 supported in the housing A.

Preferably the hub 5 of the gear 3 is extended inwardly of the cage 1 and is suitably bushed, as at 8, for rotarily, in turn, supporting the inner end of the shaft C. The hub 9 of the gear 4 likewise engages and is supported on a suitably squared portion of the inner end of the axle-shaft C, the other trunnion 10 of the cage 1 being supported, in turn, on the hub 9, whereby the axle-shafts B, C, are thus connected for differential rotation, as customary in the art and as clearly seen in Figure 1.

Power is transmitted to the differential D by means of a unique form of planetary reversing mechanism E, which includes a driven member or internal ring gear 11 suitably mounted on, and the toothed-drum of which projects over, the trunnion 10 of the cage 1. The driven gear 11 meshes with a series of four, in the present instance, planet pinions 12, each of which includes a shaft 13 suitably, as in bearings 14, rotarily supported in a so-called reversing cage or rotor 15, which latter embraces the shaft C and has a central bore 16 in which are mounted suitable bearings 17 for supporting the cage 15 on, and rotarily with respect to, the shaft C, for purposes presently appearing.

At its inner end, the pinion-shaft 13 carries a bevel-gear 18, which meshes with a pair of diametrically opposite bevel-pinions 19 rotarily supported on a shaft 20 radially disposed in a recess or chamber 21 provided in the cage 15. Longitudinally opposite each bevel-gear 18, is a second bevel-gear 22 meshing likewise with the bevel-pinions 19, the gear 22 being mounted on a shaft 23 supported for rotation in the cage 15 on suitable bearings 24.

At their respective outer ends, the series of shafts 23 carry also respective planetary-pinions 25, which mesh with a driving member or sun-gear 26 mounted on a trunnion-extension 27 of a rotatory frame or main driving member F of the apparatus. The trunnion 27 is rotarily mounted in co-axial relation with the internal gear 11 in a bearing 28 supported in a member 29 disposed transversely in the housing A, as best seen in Figure 1.

Mounted on the frame F, is bevel ring-gear 30, which meshes with a bevel pinion 31 on the end of the drive-shaft G supported in the housing A by suitable bearings in the customary manner, merely one, that is to say, the inner, bearing 32 being shown.

The shaft G being connected with a suitable source of power, as an automotive engine (not shown), torque is transmitted at a suitably reduced speed through the reduction gearing 30—31 to the frame F and from thence to the sun-gear 26, the latter thus rotating at the same speed as, and in synchronism with, the frame F.

The torque thus applied to the gear 26 is transmitted with approximately equal effect to each of the planetary-pinions 25, which, in turn, apply a rotatory bias through the bevel-gears 22, pinions 19, and bevel-gears 18, to the respective planet-pinions 12. It will be seen that the rotatory bias of the planet-pinions 25 actuated by the external or sun-gear 26 is, by the gears 18, 19, 22, applied to the planet-pinions 12 in reverse direction, as indicated by the respective arrows in Figure 11.

Considering the power-torque applied to the external gear 26 and the reversely acting load-resistance applied to the internal-gear 11, it will be seen that the rotative-bias on the planet-pinions 25 is applied to the planet-pinions 12 with the effect of biasing the pinions 12 on the internal gear 11 for movement therefor in the same direction as that of the external sun-gear 26. The pinions 12 and 25 are of approximately equal pitch radius, so that the tangent force applied at the pitch-circle of the pinions 12 is substantially equal and in direction opposite to the tangent force applied at the pitch circle of the pinions 25. It follows that, by reason of such equal and opposite reactions of the pinions 12, 25, the rotatory support thereof, that is to say, the cage 15, if not otherwise restrained, will revolve on its longitudinal axis at the same speed and direction of the sun-gear 26. The planets 12, 25, likewise remain stationary on their respective axis in the cage 15, and the power-torque from the external gear 26 is transmitted at one-to-one ratio to the internal-gear 11, the planet-pinions 12, 25, acting in such case as mere positive clutching elements, and the rotor 15 serving as a support for the pinions 12, 25, for revolution of their axes of rotation bodily about the co-axis of the gears 11, 26, for unison response of the gear 11 to actuation thereof by and with the gear 26, the mechanical efficiency of the mechanism E being then approximately unity.

Figure 11:
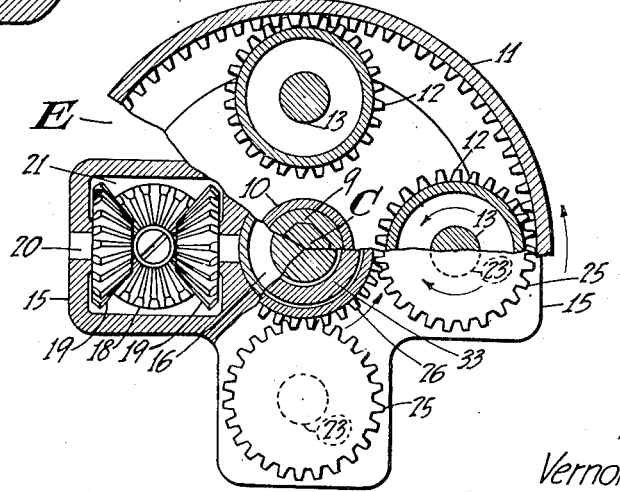
Figure 11 is a fragmentary transverse sectional view through the planetary reversing mechanism, taken approximately along the line 11—11, Figure 1.

However, an inspection of Figure 11 will show that, if the cage 15 be fixed against revolution on its axis, or stationary in space, as may be said, the planet-pinions 12, 25, will rotate at equal speeds in opposite directions, functioning in such regard as reversing idlers, the internal gear 11 being then driven in the same direction as the external gear 26 at a reduced speed-ratio according to the relative pitch-diameters of the respective-gears 11, 26, which, in the present instance, is a three-to-one reduction.

It follows that, by retarding the revolutional velocity of the cage 15, the planet-pinions 12, 25, will correspondingly rotate on their respective axis and have a differential movement with respect to the gears 11, 26, that is to say, the pinions 12, 25, will have a "back-travel", as may be said, relatively to the gears 11, 26, and will lose motion or have a "creep" relatively thereto, which will be dependent on the degree of retardation of the cage 15, with corresponding speed-reduction in the rotational velocity of the internal-gear 11 relatively to the external-gear 26, the ratio of speed reduction being variable, in the present instance, from unity to three-to-one.

For effecting such retardation of the cage 15, a suitable mechanism is employed as presently appearing, and for effecting operative connection therewith, the cage 15 is provided with a sleeve-extension 33 projecting through the trunnion 27 and rotarily supported therein by suitable bearings 34. On the end of the sleeve 33, is mounted a differential H having, in the present instance, four bevel-pinions 35 rotarily supported on pins 36 radially projecting from the sleeve 33 for revolution of the pinions 35 bodily therewith, as best seen in Figures 1 and 3.

The pinions 35 mesh with oppositely disposed bevel-gears 37, 38, freely rotationally supported on the sleeve 33. The bevel-gears 37, 38, carry also series of bevel teeth, 37', 38', respectively for meshing engagement with corresponding bevel-gears 39, 40, also respectively, mounted for rotation about axes right-angularly disposed with respect to the longitudinal axis of the machine, as best seen in Figure 2, the ratio of pitch-diameters of the respective pairs of gears 37', 39, and 38', 40, being equal, for purposes presently appearing.

The gears 39 are mounted on respective clutch mechanisms K disposed on diametrically opposite sides of the longitudinal axis of the machine, and the gears 40 are mounted on similar respective clutch mechanisms K' disposed likewise on diametrically opposite sides of the longitudinal axis of the machine in quadrature with respect to the mechanisms K, as best seen in Figure 2.

Each of the mechanisms K comprises a clutch housing or drum 41, to which the gear 39 is suitably attached. The drum 41 is provided with an inwardly presented hub 42 supported, as by bearings 43, on an oscillatory member or counter-shaft 44 extending radially in the frame F. At its inner end, the shaft 44 is suitably squared for receiving a complementarily formed hub 45 of a crank 46 presently fully described, and the hub 45 is, in turn, rotarily mounted in a bearing 47 supported by a bracket 48 carried by the frame F, as best seen in Figures 3 and 4.

Mounted on the shaft 44 for revolution therewith in the drum 41, is a spider 49 carrying on its periphery a series of circumferentially spaced longitudinal keys 50 suitably engaging a longitudinally spaced series of annular clutching discs or plates 51. On its inner peripheral wall, the drum 41 is likewise provided with a series of circumferentially spaced keys 52, which, in turn, engage a longitudinally spaced series of annular clutching discs 53 disposed intermediate the respective pairs of discs 51, suitable annular rings or discs 54 of friction material being interposed between each pair of co-operating discs 51, 53, in the manner usual in so-called multiple-disc clutches.

A friction ring 54 is also disposed between the innermost disc 51 and the inner end wall of the drum 41, and likewise a friction ring 54 is disposed on the outermost disc 53 and an annular compression-plate 55, which also has engagement with the keys 50 of the spider 49. Projecting outwardly from the plate 55, is an annular bearing seat 56, in which is mounted a suitable thrust-bearing 57 which preferably, as in the present instance, comprises a ball or roller bearing of the radial-thrust type having the inner face of its outer race engaging the outer face of the plate 55.

In the bore of the bearing 57, is mounted an axially shiftable cylinder or sleeve 58 having a peripheral flange 59 for bearing on the outer face of the inner race of the bearing 57. At its outer end face, the cylinder 58 is provided with a series of teeth 60, which mesh with complementary teeth provided in the opposing face of a suitably formed spring-cage 61 mounted, in turn, on the inner face of a trunnion 62 whose outer end is clamped in a boss 63 of the frame F, the latter, it may be said, being suitably split for facilitating the assembly of its contained mechanisms, as best seen in Figures 2 and 3.

For rotarily supporting the outer end of the drum 41, the latter is provided with an extension 41' engaging a suitable bearing 62' mounted on the trunnion 62, as best seen in Figure 4.

The trunnion 62 is provided with an axial bore or chamber 64, in which is slidably mounted a recessed head 65, a bearing 66 being axially shiftably mounted in the recess of the head 65 for rotarily supporting the shaft 44 at its outer end, as best seen in Figure 4.

Normally the head 65 is inwardly biased in the chamber 64 by means of a suitable tensional member in the form of a coiled-spring 67 having one end seated in a spring-cup 68 bearing on the outer face of the head 65, the spring 67, at its outer end, engaging a retainer plate 69 removably secured in the chamber 64 by means of a retainer spring-ring 70 seated in a suitable groove in the wall of the chamber.

The function of the spring 67, as will presently more fully appear, is to cause the drum 41 to become clutched to the spider 49 by pressing the several members 51, 53, 54, and 55, frictionally one upon the other. However, these several parts have a tendency to wear and lose their proper adjustment, for which reason I prefer to provide an automatic take-up J, now to be described.

Inwardly extending from the head 65, is a sleeve 71 embracing the shaft 44. Adjacent the head 65, the sleeve 71 is provided with a series of longitudinal grooves 72 disposed oppositely to a similar series of grooves 73 provided in the inner wall of the cage 61. In the space between the sleeve 71 and cage 61, is mounted an annular washer 74 provided with suitable inside and outside series of peripheral teeth for meshing in the respective grooves 72, 73, whereby the sleeve 71 is restrained against rotatory movement with respect to the frame F.

A second annular washer 75 is clamped between the engaged faces of the cage 61 and trunnion 62 for projecting over the washer 74, suitable tensional members or springs 76 being engaged between the washers 74, 75, for normally inwardly biasing the washer 74 for abutting its respective inside teeth on the inner end walls of the corresponding grooves 72, the respective outside teeth of the washer 74 being then spaced, however, from the inner end wall of the corresponding grooves 73 of the cage 61, as best also seen in Figure 4.

The sleeve 71 is provided with a circumferential series of preferably four equally spaced transverse semi-cylindrical toggle seats or grooves 77 suitably spaced from the inner end of the respective grooves 72. Having their inside end rockably seated in the toggle-seats 77, are respective pairs of diametrically opposite radially disposed toggles 78, one pair thereof, in the present instance, being at right-angles to the other. The outside end of each toggle 78 is seated in the outer end of a wedging-member or grip-block 79 provided adjacent its inner-end with an inside anchor point or spike 80 engaging the inner end of the sleeve 71, and an outside anchor-point or spike 81 engaging the inside face of the sleeve 58. A spacer element or washer 82 is mounted on the sleeve 71, the washer 82 having suitable notches for receiving the respective blocks 79 for retaining the same in their particular positions.

Opposite each toggle 78, the spring cage 61 is provided with a projecting stop 83. A suitable thrust-receiving member, as a radial-thrust ball or roller bearing 84, is mounted on the shaft 44 adjacent the hub of the spider 49. A series of tensional members or springs 85 are mounted on the outer-race of the bearing 84, each spring 85 yieldingly supporting a particular block 79 for biasing the same upon its engaged toggle 78, and the latter, in turn, more or less toward the stops 83. For preventing rotation of the outer face of the bearing 84, the same is loosely keyed, as at 86, to the adjacent end of the sleeve 58, all as best seen in Figure 4.

Normally, the springs 76 press the sleeve 71 inwardly on the shaft 44, and the springs 85, as has been said, press the blocks 79 in contrary direction, thus biasing the toggle 78 for swinging the respective blocks 79 outwardly from the sleeve 71. The grip-points 80, 81, are suitably offset relatively one to the other on each block 79, whereby the swinging actuation of the block 79 presses the points 80, 81, upon the respective sleeves 58, 71, the sleeve gripping pressure applied to the blocks 79 by the springs 76, 85, being normally sufficient for firmly engaging the blocks 79 with and between the respective sleeves 58, 71.

Normally, the spring 67 acts for forcibly biasing the sleeve 71 for, in turn, through the toggles 78 applying a toggle-pressure to the blocks 79 for more firmly gripping and effectively locking the sleeves 58, 71, one to the other for thus transmitting the pressure of the spring 67, through the bearing 57, to the compression-plate 55, whereby the friction rings 54 and discs 51, 53 are likewise firmly gripped together for frictionally clutching or locking the drum 41 to the spider 49.

At certain periods of the operation of the apparatus, however, the constraint of the spring 67 is removed from the sleeve 71 for freeing the drum 41 from the spider 49. For such purpose, the shaft 44 is provided with an axial bore in which is reciprocably mounted a plunger 87 having its outer end engageable with a boss 88 on the spring-cup 68, the spring 67 being of sufficient strength to resist the tendency of the plunger 87 to move outwardly during the operation of the apparatus.

At its inner end, the plunger 87 is engaged by a lever 89 pivotally supported, as at 90, on the frame-member 48, the lever 89 being pivotally connected, as at 91, in bell-crank manner to a push-rod 92, presently more particularly described. It may here be said, however, that at suitable intervals the push-rod 92 is actuated for swinging the lever 89 upon the plunger 87 and shifting the latter outwardly for, in turn, lifting the cup 68 from the sleeve-head 65, thus freeing the sleeve 71 from the tensional bias of the spring 67.

It may also be here said that, as the friction members 51, 53, 54, and 55 become worn from use, the spring 67 will cause the head 65 to move further and further inwardly on the shaft 44, until finally the cup 68 will impinge the end of the shaft 44, thus rendering the spring 67 ineffective for its intended purpose. The take-up J provides a means for adjusting the relationship between the inside sleeve 71 and the outside sleeve 58 for shifting the latter relatively to the former, so that the head 65 will project sufficiently above the end of the shaft 44, whereby the cup 68 will at all times stand clear of the shaft 44. The take-up mechanism J acts for such purpose whenever the clutching movement of the head 65 is sufficient to bring the washer 74 into engagement with the inner end wall of the respective grooves 73, which occurs while the cup 68 is yet clear of the shaft 44. This results in freeing the blocks 79 of the pressure of the springs 76, whereupon, as soon as the pressure of the spring 67 is released from the head 65, the blocks 79, under the pressure of the springs 85, are shifted outwardly until the toggles 78 impinge the stops 83, the toggles 78 then sliding on the stops 83 for, in turn, shifting the sleeve 71 outwardly until, again, the washer 74 is spaced from the end wall of the respective slots 73, thus restoring the equilibrium of the springs 76 and 85 for gripping the blocks 79 on and between the sleeves 58 and 71, the latter having been, as will be seen, shiftably adjusted with respect to the former, and the "take-up" thus automatically effected.

The mechanisms K', it may here be said, are identical with the mechanisms K, except that the gear 40 of the mechanisms K' is necessarily of larger pitch-diameter than the gear 39, in order that the gear 40, which meshes with the more distant differential gear 38', may, as has been said, have the same tooth-ratio therewith as the gear 39 bears to the differential gear 37'. In the present instance, this ratio is approximately as two is to three, whereby 120° of rotation of the respective gears 39, 40, will effect 180° of rotation of the corresponding differential gear 37 or 38, as the case may be, for a purpose soon appearing.

It will be borne in mind that, when the apparatus is in its normal condition for transmitting power at its one-to-one ratio, the cage 15 revolves with the sun-gear 26 and its connected frame F. The several mechanisms K, K', being supported by the frame F for revolution therewith, and the differential H likewise revolving with the cage 15, the gears 37, 38, 39, and 40 revolve about the longitudinal axis of the apparatus in unison without movement relatively one to the other.

When, however, the respective spiders 49 of a particular pair of right-angularly disposed mechanism K, K', are connected or clutched to the corresponding drums 41, it will be seen that, by suitably actuating the cranks 46 for oscillating the counter-shafts 44 and their respective connected spiders 49 in timed relation with rotation of the frame F, the respective gears 39, 40, may be rotarily actuated for, in turn, through co-operation of the differential gears 37, 38, with the differential pinions 35, effecting rotatory actuation of the differential H relatively to the frame F, and consequently cause the cage or rotor 15 to have a rotational movement relatively to the sun-gear 26 for effecting a speed reduction in the gearing E, as hereinbefore set forth.

For effecting such actuation of the cranks 46, a mechanism L is provided, which includes a ball-shaped or spherical hub 93 projecting axially from the frame F and concentrically disposed with respect to the axis thereof, as best seen in Figures 1, 3, and 8. The sphere 93 is provided with a plurality of longitudinal peripheral grooves or ways 94, there being four of the ways 94 in the present instance, equally spaced circumferentially in the transverse diametrical plane of the sphere 93. Slidably mounted in each way 94, is an orbitally moving member or shoe 95 which carries a radially extending pin 96, as best seen in Figures 8 and 9.

In turn, pivotally mounted on the pin 96 for oscillation thereon, is a like orbitally moving member or vane 97 having an arcuate periphery and parallel sides for slidably engaging an annular channel or way provided in a suitably formed circular race or ring 98. There are four of the vanes 97 arranged in quadrature about the sphere 93, the vanes 97 revolving with the sphere 93 in the channel of the ring 98.

The ring 98 is fixed against rotation, being suitably provided with a pair of diametrically opposite axes or shafts 99 pivotally engaging respective bearings 100 extending inwardly from the respective side walls of the housing A. However, the ring 98 may be oscillated in a longitudinal axial plane of the sphere 93 for taking a variably inclined or oblique position relatively to the longitudinal axis thereof, as best seen in Figures 1 and 3.

Figure 9:
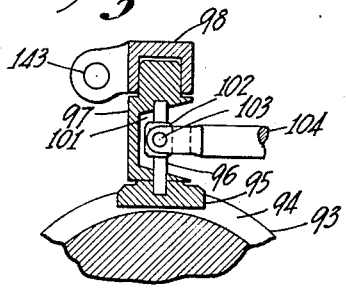
Figure 9 is a fragmentary sectional view taken approximately at the line 9, Figure 8.
Figure 10:
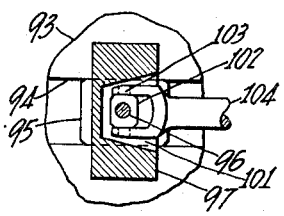
Figure 10 is a fragmentary sectional view taken approximately along the line 10—10, Figure 8.

Each of the vanes 97 is provided with a recess or chamber 101, through which the pin 96 extends, and supports centrally therein a gimbal-block 102 carrying diametrically oppositely projecting pins 103 on which are pivotally mounted the respective forks of a suitable yoke, the whole comprising a universal joint construction, as will be understood and as best seen in Figures 9 and 10, the yoke forming one terminal or end of a vibratory link 104, whose other end extends suitably into the frame F and has a ball-and-socket connection 105 with the crank 46 of a respective mechanism K or K', as the case may be, and as best seen in Figures 3, 4, and 8.

As will be understood from Figure 3, the several links 104 are of equal length and connect the respective cranks 46 with the vanes 97 of the mechanism L in a common diametrical plane of the race 98, such plane intersecting the center of the sphere 93 at all degrees of obliquity or inclination of the race 98 relatively thereto, as best seen in Figure 1.

It follows that, during the operation of the apparatus the orbitally moving vanes 97, being guided in an oblique orbit or in the inclined plane of, and by, the circular race 98, reciprocate or shift the links 104 longitudinally in the machine for correspondingly swingably actuating the cranks 46, the amplitude of the swing of the respective cranks 46 varying responsively to variations in the degree of inclination of the race 98 with respect to the diametrical plane of the axes of the mechanisms K, K'.

Thus, for example, at the particular instance of the operation as shown in Figure 1, the upper link 104 is advanced for swinging its connected crank 46 of the upper mechanism K to extreme right-hand position, the lower link 104 is retracted for swinging its connected crank 46 of the lower mechanism K to extreme left-hand position, while the two side links 104 are disposed in mid-position of their stroke for correspondingly disposing their respective connected cranks 46 of the mechanisms K' in mid-swung position, as also shown in Figure 3.

At the conclusion of the next quarter revolution of the frame F and its connected sphere 93, the cranks 46 of the mechanisms K are shifted to mid-position, while the cranks 46 of the mechanisms K' are swung to extreme advanced and retracted positions, respectively, and so on, whereby the several cranks 46 are successively oscillated from advanced to retracted position and back again once during each revolution of the frame F for, in turn, sequentially rotarily actuating or oscillating the respective shafts 44 and spiders 49 of the mechanisms K, K'.

Now, as has been said, the spiders 49 are normally clutched or connected to their respective drums 41. However, the drums 41 of the mechanisms K are connected with each other through the differential gear 37, and the drums 41 of the mechanism K' are likewise connected through the differential gear 38. On the other hand the differential gears 37, 38, may have a relative movement one to the other for co-operatively rotarily actuating the cage 15, as will shortly appear. It will be clear, then, that at least one pair of the mechanisms K, K', must be free from the respective cranks 46 in order to permit the other pair of mechanisms K, K', to be in operative condition for actuating the differential H.

As has also been said, this freeing of the mechanisms K, K', is effected by means of the push-rods 92, which are reciprocably mounted in respective bores longitudinally provided in the hub of the sphere 93, the rods 92 being disposed, as will be understood, preferably in quadrature or 90° apart about the hub axis. At their respective outer ends, the rods 92 terminate in respective recesses 106 provided in a sleeve extension 107 of the sphere 93, the sleeve 107 being rotarily supported in a suitable bearing 108 mounted in a support 109 carried by the housing A.

On its face confronting the sphere 93, the support 109 is provided with an annular cam 110 comprising a retracted portion a of approximately 180° of arc, an advanced portion b also of approximately 180° of arc, and abruptly inclined portions, as at c, connecting the cam-portions a, b, and b, a, respectively, as best seen in Figures 1 and 3.

The cam 110 is engaged by a series of four radially disposed follower-levers 111, each having its outer end pivotally supported in a suitable bracket 112 mounted on the sleeve 107, the follower 111 at its inner end working in a corresponding recess 106 for co-operative engagement with the particular push-rod 92 projecting thereinto, as also best seen in Figures 1 and 3.

During 180° of revolution of the frame F, a particular follower 111 engages the retracted portion a of the cam 110, the spring 67 of the corresponding mechanism, as K in Figure 1, then being effective for clutching the drum 41 to the spider 49. At the same time, the particular link 104 is shifted by the mechanism L from advanced to retracted position for swinging the crank 46 in like direction, thus rotating the gear 39 a degree dependent upon the inclination of the ring 98.

Meanwhile, the follower 111 of the opposite mechanism K engages the cam-portion b for lifting the spring 67, thus releasing the drum 41 from the spider 49 during the time the crank 46 is swung from retracted to advanced position, the drum 41, however, being rotated in opposite direction by reason of its interconnection, through the differential gear 37, with the gear 39 of the first mentioned mechanism K, that is to say, while one mechanism K is in operative engagement through the gears 37, 39 with the differential H, the opposite mechanism K is merely idling in the frame F.

On one quarter turn of the frame F from the time the first follower 111 drops onto the cam portion a, the follower 111 of the next succeeding mechanism K' engages the cam portion a, whereby the spring 67 of such particular mechanism K' acts for clutching its drum 41 to the spider 49 during the period the corresponding link 104 is, in turn, shifted by the mechanism L from advanced to retracted position for swinging the crank 46 and rotating the gear 40 likewise a degree dependent upon the inclination of the ring 98.

Now, again, in the manner set forth for the pair of mechanisms K, so also when one mechanism K' is in operative engagement through the gears 38, 40, with the differential H, the opposite mechanism K' is idling in the frame F. Thus, at 90° intervals of revolution of the frame F, the respective mechanisms K, K', K', K, are successively engaged with the differential H, and it will be seen that the period of engagement of a particular mechanism, as K, overlaps by 90° the period of engagement of the previous mechanism, as K', and likewise overlaps by 90° the period of engagement of the succeeding or opposite mechanism K', and so on during the operation of the machine.

Now, it will be seen that the differential gear 37, being actuated by one mechanism K, is started from rest and accelerated to maximum speed at the end of 90° of revolution of the frame F. At such time, the differential gear 38 is actuated from rest by the succeeding mechanism K and accelerated to maximum speed as the mechanism K' brings its connected gear 38 to rest, and thus the respective gears 37, 38 are alternately in succession accelerated and decelerated during the operation of the machine.

The action of the differential H is to smooth-out or compensate for such variations in the angular velocity of the gears 37, 38, so as to apply to the cage or rotor 15 a substantially uniform motion having a certain velocity ratio relatively to the frame F and its connected sun-gear 26, which ratio may be continuously varied between predetermined limits, that is to say, when the race 98 is disposed substantially at right angles to the longitudinal axis of the frame F, the entire mechanism rotates as a unit at "high-speed" or one-to-one transmission ratio, and when the race 98 is disposed at maximum obliquity, the rotor 15 revolves at a velocity equal to and reversely of the speed of the sun-gear 26, the rotor 15 being then, as will be seen, substantially stationary in space and the apparatus operating at "low-speed" or three-to-one transmission ratio.

The ratio of speed transmission of the apparatus may, therefore, be regulated by suitably inclining the race 98 of the mechanism L. Inclination of the race 98 may be effected by any suitable form of manual control, or the race 98 may be actuated by means of an electrically operated mechanism, as a motor, solenoid, or the like, controlled from some distant or remote point, as the dash-board or steering wheel of an automotive vehicle.

Preferably, however, the regulation of the mechanism L is effected automatically in response to variations in the speed of revolution of the frame F by means including a governor-mechanism M. For such purpose, the sleeve 107 is extended beyond the bearing 108, and a collar 113 is slidably mounted on the sleeve-extension 107 for reciprocation thereon, the collar 113 being biased toward the bearing 108 by a suitable tensional member in the form of a coiled spring 114 mounted on the sleeve 107 and engaging its ends respectively with the collar 113 and a stop 115 provided on the end of the sleeve.

Radially extending from the sleeve 107 adjacent the bearing 108, is a series of four pairs, in the present instance, of brackets 116, each pair thereof pivotally, as at 117, supporting an eccentric weight 118 which carries an inwardly extending arm 119 having engagement with the adjacent end-face of the collar 113, whereby, on revolution of the frame F and its connected sleeve 107, the weights 118 will fly outwardly, causing the arms 119 to press or shift the collar 113 along the sleeve 107 against the tension of the spring 114, the shifting movement of the collar 113 being thus responsive to speed variations of the frame F in the manner usual in governor-constructions, as best seen in Figure 1.

A yoke-ring 120 slidably engages a suitable circumferential groove in the collar 113 and carries a radial arm 121 suitably extended and attached to one end of an elongated sleeve or guide 122 slidably mounted on a guide-rod 123 supported in a suitable pocket 124 of the housing A for extending longitudinally therein parallel with the axis of the sleeve 107. On the other end of the sleeve 122, is a second yoke-ring 125 forming a part of an automatic shifter-mechanism N mounted on an elongated screw or worm 126 also mounted in the pocket 124 parallel with the guide-rod 123.

The shifter mechanism N, best seen in Figures 5, 6, and 7, includes an elongated nut or body-member 127 having threaded engagement with the screw 126. Suitably keyed to the respective opposite ends of the nut 127, is a pair of cylindrical discs 128, 128', each provided with a circumferentially spaced series of tangential pockets 129, 129', as the case may be, and preferably four in number, the tangential axes of the several pockets 129 in the disc 128 being oppositely disposed to the tangential axes of the pockets 129' in the disc 128', as best seen in Figures 5 and 7, respectively.

In each of the pockets 129, is mounted a ball 130 suitably seated on a spring 131 disposed between the end wall of the pocket 129 and the ball 130 for normally urging the latter outwardly of the pocket 129 for wedging the ball 130 between the inner wall of the pocket 129 and the inside wall of a drum 132 enclosing the disc 128, the pockets 129' of the discs 128' being similarly equipped for co-operation with a drum 132', the mechanisms contained in the drums 132 or 132', as the case may be, forming, as may be said, a pair of one-way ratchet or over-running clutches operable in opposite directions.

The drums 132, 132' each include an inner hub or diametrical wall 133 rotationally engaging the periphery of the nut 127 and carrying a female cone-member 134 or 134', respectively, inwardly extending from the hub 133, as best seen in Figure 6.

Disposed between the pair of opposing cones 134, 134', is a corresponding pair of complementary male cones or clutching members 135, 135', respectively, each slidably and rotationally mounted on the periphery of the nut-body 127. The cones 135, 135' are disposed for respective operative engagement with the opposing female cones 134, 134' of the drums 132, 132', respectively, suitable tensional members or springs 136 being engaged between the cones 135, 135' for normally biasing the same into clutching engagement thereof with the drums 132, 132'.

The yoke-ring 125 is disposed between the pair of male cones 135, 135', and is provided on its respective side faces with series of teeth 137, 137', also respectively, the teeth 137 being staggered with respect to the teeth 137'. The male cone 135 is provided with a corresponding series of axially projecting fingers 138, which extend through or inside of the ring 125 and have outturned teeth or lugs 139 each disposed for meshing between a corresponding pair of the teeth 137 of the ring 125. In a similar manner, the cone 135' is provided with a series of fingers 138' meshing between the fingers 138 and likewise carrying respective teeth 139' for meshing engagement with the teeth 137' of the ring 125, whereby the cones 135, 135' have positive connection with the yoke 125, as best seen in Figures 5 and 6.

The drum 132' is suitably provided with a circumferential groove in which is slidably mounted a yoke-ring 140 connected to one end of a guide or elongated sleeve 141 also slidably mounted on the guide-rod 123. Inwardly extending from the other end of the sleeve 141, is an arm 142 terminating in a slotted eye in and through which is mounted a pin 143 carried by a suitable ear or lug mounted on an adjacent portion of the race 98 of the mechanism L, as best seen in Figures 1 and 9.

It is evident that, during the operation of the apparatus, certain vibrational forces occur responsive to the reciprocation of the vibratory links 104, which tend to oscillate the race 98 about its axes 99. The oscillatory vibratory stresses in the race 98 are normally resisted by the device N, which acts in the following manner,—

When the vibration forces act in one direction, for example to the left in Figure 6, such forces are transmitted from the race 98 through the pin 143, arm 142, sleeve 141, yoke 140, drum 132', and thus to the nut-body 127, as an axial force on the latter, whereby the nut 127 tends to rotate on the screw 126 so as to shift therealong in the direction of the applied forces.

In the present instance, the rotational bias thus applied to the nut 127 tends to rotate the same in counterclockwise direction, reference being made to Figures 5 and 7. Now, normally the drums 132, 132' are clutched to the cones 135, 135', respectively, and the latter are, as described, positively connected to the yoke 125, which, in turn, is anchored, as may be said, on the rod 123; therefore, the drums 132, 132', are by such means effectively locked against rotation.

The counterclockwise rotatory bias of the nut 127 tends to roll the balls 130 of the disc 128' outwardly in the pockets 129' thereof for wedging each ball 130 between the walls of its pocket 129' and the drum 132', thus effectively locking the nut 127 against rotation in its biased direction, the springs 131, it will be understood, normally effecting such wedging action, so that the nut 127 has very little or substantially no rotatory movement.

Against such counter-clockwise bias of the nut 127, however, the drum 132 has no locking effect, since the balls 130 thereof tend to roll inwardly of the pockets 129 for releasing the disc 128 from the drum 132. Yet, on reversal of the vibrational forces set up in the race 98, the nut 127 is biased for clockwise movement whereupon the disc 132 becomes locked to the drum 134 and the nut 127 is again prevented from taking any rotational movement, substantially in the manner previously set forth.

It will be seen, however, that, when the governor-mechanism M acts, for example, responsively to increasing speed of the frame F, the weights 118 move outwardly, shifting the collar 113 and likewise, through the yoke 120, arm 121, and sleeve 122, shifting the yoke-ring 125 to the left in Figure 6, the yoke 125 then acting laterally on the teeth 139' for, through the fingers 138', withdrawing the cone 135' from the cone 134', thereby releasing or freeing the drum 132' for permissive rotation thereof by and with the disc 128'.

In such event, a counter-clockwise rotational bias on the nut 127 becomes effective for revolving the nut 127 on the screw 126 for shifting the device N toward the left, reference being again made to Figure 6, and, such left-hand movement of the device N being transmitted to the race 98 of the mechanism L, the same is caused to rotate on its axes 99 for taking a more vertical position, that is to say, the angle of inclination of the race 98 with respect to the frame F will be reduced, the stroke of the respective links 104 will be shortened, the mechanisms K will have a lesser degree of rotation, the velocity of the rotor 15 will more nearly approach the velocity of the frame F, and the speed-ratio of the transmission will correspondingly approach unity.

The shifting mechanism will thus act for varying the reduction-ratio of the apparatus until the acceleration of the frame F ceases and the weights 118 become stationary, when, the yoke 125 coming to a standstill, the device N catches up, so to speak, with the governor-actuated yoke-ring 125, the clutch-cone 135' is released for engaging the drum 132' and the mechanism L becomes locked in its newly adjusted position. I might add that, when the weights 118 are at their extreme outwardly swung positions, the race 98 is disposed at right-angles to the axis of the frame F and the apparatus is operating, as has been said, at a one-to-one speed transmission ratio.

The reverse action of the several parts of the apparatus responsively to deceleration of the frame F will be readily comprehended from the foregoing description. It suffices merely to say that, when the weights 118 are at their innermost positions, the device N will be shifted for disposing the race 98 at its maximum inclination, when, as has been said, the apparatus will operate at its maximum speed-reduction ratio.

In use and operation, it will be seen that, when applied, for example, to an automotive vehicle for torque-transmitting purposes, an increase of speed of the engine of the vehicle due to diminution of load or, conversely, an increase in the torque output of the engine, will result in a reduction of the speed-transmission ratio for correspondingly increasing the speed of the vehicle. And, likewise, an increase of load will result in an increase in the speed-transmission ratio for reducing the speed of the vehicle, which, however, may be compensated for by increasing the throttle opening of the engine for increasing the torque output thereof.

The apparatus thus automatically effects a continuously variable speed-transmission ratio for an automotive vehicle whereby the operation thereof under substantially all traffic conditions may be effectively controlled by a mere manipulation of the throttle of the engine. It will be obvious, moreover, that by providing a manually controlled-means for shifting the mechanism L, substantially an infinite number of speed ratio variations may be effected between predetermined limits as determined by the construction of the apparatus and independently of the power output of the engine.

It will be further seen that my invention accomplishes its objects, and I might add that, in practice, the force required for actuating the rotor 15 for effecting the various speed reductions in the apparatus are relatively of such small magnitude that the entire mechanism may reasonably be contained, for example, in a housing comparable in size with a rear-axle housing of an automotive vehicle of corresponding torque-delivery requirements.

It will be understood that, if desired, a suitable arrangement of spur-gear, or other similar reversing mechanism, may be employed in place of the bevel-gears 18, 19, 22, and likewise that other changes and modifications in the form, construction, arrangement, and combination of the several parts of the variable speed-ratio transmission may be made and substituted for those herein shown and described without departing from the nature and principles of my invention.

Having thus described my invention, what I claim and desire to secure by Letters Patent is,—

1. In a variable speed-transmission, in combination, a driving-element, a first rotatable member having operable engagement with the driving-element, a driven-element, a second rotatable member having operable engagement with the driven-element, and a support for said members including means for connecting the second member reversely with the first member for effecting substantially equal and opposite torque-transmission reactions on the support for movement of the support normally in the same direction as the driving-element.

2. In a variable speed-transmission, in combination, a driving-element, a first rotatable member having operable engagement with the driving-element, a driven-element, a second rotatable member having operable engagement with the driven-element, means for connecting the second member reversely with the first member, and a support common to said rotatable members disposed for movement normally at the speed of the driving-element for effecting unity speed transmission between the driving and driven elements.

3. In a variable speed-transmission, in combination, a driving-element, a first rotatable member having operable engagement with the driving-element, a driven-element, a second rotatable member having operable engagement with the driven-element, a shiftable support for said members including means for connecting the second member reversely with the first member, and means for effecting differential motion of the support relatively to the driving-element for effecting, in turn, a speed-reduction transmission between the driving and the driven elements.

4. In a variable speed transmission, a driving-member, a driven member, a pair of co-operating intermediate elements connected for actuation each reversely of and by the other in respective engagement with the driving and driven members, and a member supporting said elements for torque transmission response of the driven member to actuation of said intermediate members by the driving member.

5. In a variable speed transmission, co-axial driving and driven members, co-operating pairs of intermediate elements connected for actuation of each element of a pair reversely of and by the other in respective engagement with the driving and driven members, and a member supporting said elements for revolution bodily about the co-axis of the driving and driven members for torque-transmission response of the driven member to actuation of said intermediate members by the driving member.

6. In a variable speed transmission, in combination, an external driving-gear, first planet pinions meshing with said gear, an internal driven-gear co-axial with the driving-gear, second planet pinions meshing with the driven-gear, a rotor supporting the pinions, and mechanism carried by the rotor including series of co-operating bevel gears operatively connecting respective pairs of first and second pinions for actuation of the internal gear by and in the same direction as the external gear.

7. In a variable speed transmission, in combination, an external driving-gear, first planet pinions meshing with said gear, an internal driven gear co-axial with the driving-gear, second planet pinions meshing with the driven-gear, a rotor rotarily supporting the pinions, and mechanism carried by the rotor for operatively connecting respective pairs of first and second pinions for actuation of the internal gear by and in the same direction as the external gear, the rotor being revolvable at differential speed with respect to said gears.

8. In a variable speed transmission, in combination, an external driving-gear, first planet pinions meshing with said gear, an internal driven-gear co-axial with the driving-gear, second planet pinions meshing with the driven gear, a rotor supporting said pinions and mounted for revolution about the co-axis of the driving and driven gears, mechanism carried by the rotor for reversely actuating the second pinions from and by the first pinions, and means for revolving the rotor at a differential speed with respect to the driving-gear.

9. In a variable speed transmission, co-axial driving and driven members, co-operating pairs of intermediate elements connected for actuation of each element of a pair reversely of and by the other in respective engagement with the driving and driven members, a revolvable member supporting said elements for revolution bodily thereof about the co-axis of the driving and driven members, and mechanism responsive to actuation of the driving member for motivating the supporting member differentially with respect to the driving-member for varying the speed-response of the driven-member to actuation thereof by and with the driving-member.

10. In a variable speed transmission, a revolvable driving frame, co-axial driving and driven members, co-operating pairs of intermediate elements connected for actuation of each element of a pair reversely of and by the other in respective engagement with the driving and driven members, a revolvable cage supporting said elements for revolution thereof bodily about the co-axis of the driving and driven members, and mechanism carried by the frame for effecting differential revolution of the cage relatively to the frame.

11. In a variable speed transmission, a revolvable driving frame, co-axial driving and driven members, co-operating pairs of intermediate elements connected for actuation of each element of a pair reversely of and by the other in respective engagement with the driving and driven members, a revolvable cage supporting said elements for revolution thereof bodily about the co-axis of the driving and driven members, and mechanism including co-operable oscillatory members actuable at adjustable angular velocities for motivating the supporting member differentially with respect to the frame for varying the speed response of the driven-member thereto.

12. In a variable speed transmission, co-axial driving and driven members, co-operating pairs of intermediate elements connected for actuation of each element of a pair reversely of and by the other in respective engagement with the driving and driven members, a revolvable member supporting said elements for revolution bodily thereof about the co-axis of the driving and driven members, co-operable oscillatory members actuable in timed relation by and with the driving member, and mechanism for connecting the supporting member with the respective oscillatory members during movement thereof in one direction for converting the motion of the oscillatory members into unidirectional revolution of the supporting-member.

13. In an automatic speed transmission, in combination, first and second shiftable friction members, means operable for intermittently shifting the friction members into engagement one with the other for effecting motion-transmission therebetween, and mechanism automatically operable on disengagement of the friction-members for compensating for wear thereof.

14. In an automatic speed transmission, a driving friction-member, a driven friction member, means for biasing said members into frictional engagement one with the other, an outer sleeve for engaging one of said members, an inner sleeve engageable with the biasing means and movable relatively to the outer sleeve and mechanism operable for gripping engagement with and between the sleeves, and shiftable relatively to the sleeves for automatically compensating for wear of the friction members responsively to operation of the biasing means.

15. In a speed transmission, in combination, a driving friction member, a driven friction member, a shiftable outer sleeve, a shiftable normally biased inner sleeve, and means operable for gripping engagement with and between the sleeves responsively to bias of the inner sleeve for shifting the outer sleeve for effecting frictional engagement between said members.

16. In a speed transmission, in combination, a driving friction member, a driven friction member, a shiftable outer sleeve, a shiftable normally biased inner sleeve, a wedging member disposed between the sleeves for gripping co-operation therewith, and a toggle-member engaged between the inner sleeve and the wedging member for actuating the latter responsively to biased movement of the inner sleeve for effecting frictional engagement between the driving and driven members.

17. In a speed transmission, in combination, a driving friction member, a driven friction member, a shiftable outer sleeve, a shiftable normally biased inner sleeve, a wedging member disposed between the sleeves for longitudinal shiftable movement relatively thereto, a toggle member movable by and with the inner sleeve responsive to biased movement of the inner sleeve for engaging the wedging member grippingly with said sleeves for effecting frictional engagement between the driving and driven members, means for freeing the bias from the inner sleeve, and means for yieldingly engaging the wedging member with the toggle-member for shifting the inner sleeve relatively to the outer sleeve when the inner sleeve is bias-free for automatically compensating for frictional wear of the driving and driven members.

18. In a variable speed transmission, an epicyclic gearing including a supporting rotor, a driving-member, and means for actuating the rotor differentially with respect to the driving-member, said means including oscillatory members, a circular race disposed in a plane oblique to the axial plane of the driving-member, a spherical member revolvable with the driving member and disposed concentrically with respect to the race, shoes longitudinally slidable on and over the spherical member for revolution therewith in an oblique orbit defined by the race, and elements orbitally revolvable with the respective shoes for longitudinal reciprocation of said elements responsively to the obliquity of the race.

19. In an automatic speed transmission, in combination, an orbital member, an orbital-guiding member shiftable for disposition in respective planes of obliquity with respect to the axis of the orbital member, and means including a vibratory member actuable by the orbital members for shifting the orbital guiding member for varying the obliquity thereof.

20. In a variable speed transmission, an epicyclic gearing including a supporting rotor, a driving-member, orbital members movable responsively to the driving-member, means for guiding the orbital members in an oblique plane, reciprocable elements actuable responsively to movement of the orbital members, mechanism for converting the motion of the reciprocatory elements into unidirectional revolution of the rotor, and means including a vibratory member actuable by the orbital members for varying the obliquity of the guiding-means for actuating the rotor differentially with respect to the driving-member.

21. In an automatic speed transmission, in combination, a driving member, an orbital member actuable responsive to the driving-member, an orbital-guiding member shiftable for disposition in respective planes of obliquity with respect to the driving-member, a vibratory member actuable by the orbital member, and means co-operably responsive both to vibration of the vibratory member and to speed of the driving member for shifting the orbital guiding-member for varying the obliquity thereof.

22. In an automatic speed transmission, in combination, a driving member, an orbital member actuable responsive to the driving-member, an orbital-guiding member shiftable for disposition in respective planes of obliquity with respect to the driving-member, a vibratory member actuable by the orbital member, means shiftably responsive to vibration of the orbitary member for effecting variation in the obliquity of the guiding-member, and means responsive to speed of the driving-member for alternatively restraining or releasing said shiftable means against and for shifting movement thereof.

23. In an automatic speed transmission, in combination, a driving-member, an orbital member actuable responsive to the driving-member, an orbital-guiding member shiftable for disposition in respective planes of obliquity with respect to the driving member, a screw-member, a rotatory body having threaded engagement with the screw-member for longitudinal movement therealong in association with the orbital guiding member, anchoring means, oppositely acting ratchets normally engaged with the anchoring means in co-operation with said body for restraining the same against rotation, and means responsive to speed of the driving member for releasing alternate ratchets from the anchoring means for permissive rotation of said body on the screw for varying the obliquity of the orbital-guiding member.

24. In a variable speed transmission, in combination, a driving-member, a driven-member, a support shiftable independently of said members, a pair of transmission-elements carried by the support in engagement respectively with the driving and driven members, and means operably connecting the transmission-elements for effecting substantially equal and opposite torque-transmission reactions on the support for movement thereof normally in unison with the driving and driven members.

25. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, and means for retarding the motion of the support relatively to said members.

26. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, and mechanism differentially actuable in timed relation by and with the driving member for retarding the motion of the support relatively to the driving members.

27. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, members differentially actuable in timed relation with the driving member, and means for cooperably connecting the differentially actuable members with the support for retarding the motion thereof relatively to the driving member.

28. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, members differentially actuable in timed relation with the driving member, and means including clutching elements for cooperably connecting the differentially actuable members with the support for retarding the motion thereof relatively to the driving member.

29. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, members differentially actuable in timed relation with the driving member, a differential gearing cooperable with the support, and means including clutching elements for connecting the differential gearing to successive differentially actuable members for retarding the motion of the support relatively to the driving member.

30. In a variable speed transmission, in combination, a driving-member, a driven member, a support shiftable independently of said members, a pair of transmission elements carried by the support in engagement respectively with the driving and driven members, means operably connecting the transmission-elements for effecting substantially equal and opposite tirque-transmission reactions on the support for movement thereof normally in unison with the driving and driven members, and mechanism including co-operating friction elements actuable for retarding the motion of the support relatively to said members.

31. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, and mechanism including co-operating friction elements and means for actuating said elements by and with the driving member for retarding the motion of the support relatively to the driving member.

32. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, members differentially actuable in timed relation with the driving member, co-operating friction elements normally biased for connecting the differentially actuable members with the support, and mechanism for successively disconnecting some of the friction elements from the differentially actuable members for effecting retardation of the motion of the support by the remaining differentially actuable members.

33. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, and mechanism including orbital members movable in a plane oblique to the axis thereof, and means for connecting the orbital members successively with the support for retarding the motion thereof relatively to the driving member.

34. In a variable speed transmission, in combination, a driving-member, a driven-member, a support shiftable independently of said members, a pair of transmission-elements carried by the support in engagement respectively with the driving and driven members, means operably connecting the transmission-elements for effecting substantially equal and opposite torque-transmission reactions on the support for movement thereof normally in unison with the driving and driven members, and mechanism including orbital members movable in a plane oblique to the axis thereof, and means including co-operating friction elements for connecting the orbital members successively with the support for retarding the motion thereof relatively to the driving member.

VERNON KINSER.